(12) United States Patent
Mathew (10) Patent No.: US 10,015,695 B2
(45) Date of Patent: Jul. 3, 2018

(54) ALLOCATION OF CONTENT TO MOBILE EDGE NODE CACHES

(71) Applicant: TELEFONAKTIEBOLAGET LM ERICSSON (PUBL), Stockholm (SE)

(72) Inventor: Nobin Mathew, Bangalore (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 60 days.

(21) Appl. No.: 15/191,190

(22) Filed: Jun. 23, 2016

(65) Prior Publication Data
US 2017/0374580 A1 Dec. 28, 2017

(51) Int. Cl.
*H04W 28/02* (2009.01)
*H04W 4/02* (2018.01)
*H04L 29/08* (2006.01)
*H04W 8/00* (2009.01)

(52) U.S. Cl.
CPC ..... *H04W 28/0289* (2013.01); *H04L 67/2842* (2013.01); *H04W 4/027* (2013.01); *H04W 4/028* (2013.01); *H04W 8/005* (2013.01)

(58) Field of Classification Search
CPC . H04W 28/0289; H04W 4/027; H04W 4/028; H04W 8/005; H04L 67/2842
See application file for complete search history.

(56) References Cited

U.S. PATENT DOCUMENTS

| | | | |
|---|---|---|---|
| 6,804,221 B1 * | 10/2004 | Magret | H04W 8/087 370/312 |
| 6,941,338 B1 | 9/2005 | Madsen | |
| 7,801,530 B2 | 9/2010 | Oswal et al. | |
| 8,717,902 B2 * | 5/2014 | Mihaly | H04L 67/28 370/229 |
| 8,838,148 B2 | 9/2014 | Shook et al. | |
| 2008/0032712 A1 | 2/2008 | Bemmel et al. | |
| 2010/0085947 A1 * | 4/2010 | Ringland | H04W 28/00 370/338 |
| 2012/0182935 A1 * | 7/2012 | Addepalli | H04W 4/02 370/328 |
| 2012/0278476 A1 * | 11/2012 | Agrawal | G06Q 50/01 709/224 |
| 2013/0208888 A1 * | 8/2013 | Agrawal | H04L 67/1021 380/255 |
| 2016/0248850 A1 * | 8/2016 | Agrawal | H04W 4/001 |
| 2016/0323408 A1 * | 11/2016 | Chung | H04L 67/2842 |
| 2017/0064616 A1 * | 3/2017 | Park | H04L 67/2842 |
| 2017/0195451 A1 * | 7/2017 | Backholm | H04L 67/2857 |
| 2017/0289593 A1 * | 10/2017 | Li | H04N 21/23106 |

FOREIGN PATENT DOCUMENTS

| EP | 1 052 820 B1 | 2/2005 |
|---|---|---|
| WO | WO 2014/138411 A1 | 9/2014 |

* cited by examiner

*Primary Examiner* — Asad Nawaz
*Assistant Examiner* — Saad A Waqas (57) ABSTRACT

A computing device in a wireless communications network identifies content to be transmitted to a mobile device in the wireless communications network. The computing device also determines mobile edge nodes that serve radio coverage areas at different positions along a path that the mobile device is expected to take while receiving the content. Further, the computing device allocates, for storage in respective caches of the mobile edge nodes, different portions of the content that are expected to be served by different mobile edge nodes as the mobile device moves along the path.

17 Claims, 10 Drawing Sheets

ALLOCATION OF CONTENT TO MOBILE EDGE NODE CACHES

TECHNICAL FIELD

Embodiments of the present disclosure generally relate to a computing device in a wireless communications network that allocates content to mobile edge node caches.

BACKGROUND

Many cloud solutions store massive amounts of content in a centralized datacenter and rely on high bandwidth network connections in order to serve that content to users upon request. However, content is getting increasingly large. For example, video streaming sites have been adopting support for increasingly large video resolutions. These higher resolution videos require correspondingly higher bandwidth to stream across the network. Many other types of content have also generally been getting larger. For example, lossless audio is becoming increasingly popular and requires significantly more bandwidth to stream as compared to audio in certain high-compression lossy formats. Datacenters that do not adjust to these trends often find that their backbone connection to the Internet is bottlenecking network traffic between the datacenter and its users.

One approach to resolve this problem may be to widen the throughput of the datacenter's backbone connection by installing additional networking infrastructure. However, this approach may be expensive, and is of little help when the bottleneck is further downstream, i.e., beyond the control of the datacenter admin (e.g., in the network of the datacenter's Internet Service Provider or other network).

A different approach may embrace mobile edge computing principles. Mobile edge computing is an approach to networking architecture that attempts to locate resources of the network closer to relevant users (e.g., within edge networks), rather than employing vast amounts of centrally-located computing and networking resources that may be prone to bottlenecking.

SUMMARY

Embodiments of the present disclosure may avoid certain congestion scenarios in a dynamic network environment by storing content within the caches of nodes of edge networks (as opposed to storing such content more centrally, for example). Particular embodiments allocate different portions of content to different mobile edge nodes according to a determination of which mobile edge nodes serve radio coverage areas along a path that a particular mobile device is expected to take while receiving the content.

One or more embodiments here include a method, implemented in a computing device in a wireless communications network. The method comprises identifying content to be transmitted to a mobile device in the wireless communications network. The method further comprises determining mobile edge nodes that serve radio coverage areas at different positions along a path that the mobile device is expected to take while receiving the content. The method further comprises allocating for storage in respective caches of the mobile edge nodes different portions of the content that are expected to be served by different mobile edge nodes as the mobile device moves along the path.

In some embodiments, the method further comprises changing the mobile edge node to which at least some of one of the different portions of the content is allocated in response to one or both of a change in speed of the mobile device and a deviation of the mobile device from the path.

In some embodiments, the method further comprises identifying each of the different portions of the content to be allocated for storage from the content.

In some embodiments, the method further comprises determining, for each of the different portions, a size of that portion based on an expected duration in which the mobile device will be within the radio coverage area served by the mobile edge node to which the portion will be allocated. In an embodiment, determining the size is further based on an average data rate of the mobile device. In an embodiment, determining the size is further based on a default allocation and a dynamic allocation, the default allocation is at least a predefined minimum size, and the dynamic allocation supplements the default allocation and corrects for a deviation of the mobile device from criteria used to determine the default allocation. In an embodiment, the method further comprises determining the expected duration based on a sample velocity measurement of the mobile device.

In some embodiments, the method further comprises determining the path based on one or both of a location history and a current trajectory of the mobile device.

In some embodiments, the method further comprises storing in a memory of the computing device a further portion of the content and transmitting the further portion towards the mobile device in response to a cache miss at one or more of the mobile edge nodes.

In some embodiments, each of the mobile edge nodes is a last hop before a radio base station serving one of the radio coverage areas for communication from the wireless communications network toward that radio coverage area.

One or more other embodiments herein include a computing device in a wireless communications network. The computing device comprises a processor and a memory. The memory contains instructions executable by the processor whereby the computing device is configured to identify content to be transmitted to a mobile device in the wireless communications network. The computing device is further configured to determine mobile edge nodes that serve radio coverage areas at different positions along a path that the mobile device is expected to take while receiving the content. The computing device if further configured to allocate for storage in respective caches of the mobile edge nodes different portions of the content that are expected to be served by different mobile edge nodes as the mobile device moves along the path.

In some embodiments, the computing device is further configured to change the mobile edge node to which at least some of one of the different portions of the content is allocated in response to one or both of a change in speed of the mobile device and a deviation of the mobile device from the path.

In some embodiments, the computing device is further configured to identify each of the different portions of the content to be allocated for storage from the content.

In some embodiments, the computing device is further configured to determine, for each of the different portions, a size of that portion based on an expected duration in which the mobile device will be within the radio coverage area served by the mobile edge node to which the portion will be allocated. In an embodiment, the computing device is configured to determine the size further based on an average data rate of the mobile device. In an embodiment, the computing device is configured to determine the size further based on a default allocation and a dynamic allocation, the default allocation is at least a predefined minimum size, and the dynamic allocation supplements the default allocation and corrects for a deviation of the mobile device from criteria used to determine the default allocation. In an embodiment, the computing device is further configured to determine the expected duration based on a sample velocity measurement of the mobile device.

In some embodiments, the computing device is further configured to determine the path based on one or both of a location history and a current trajectory of the mobile device.

In some embodiments, the computing device is further configured to store in the memory a further portion of the content and transmit the further portion towards the mobile device in response to a cache miss at one or more of the mobile edge nodes.

In some embodiments, each of the mobile edge nodes is a last hop before a radio base station serving one of the radio coverage areas for communication from the wireless communications network toward that radio coverage area.

One or more yet other embodiments include a non-transitory computer readable medium storing a computer program product for controlling a programmable computing device in a wireless communications network. The computer program product comprises software instructions that, when executed by the programmable computing device, cause the programmable computing device to identify content to be transmitted to a mobile device in the wireless communications network. The software instructions further cause the programmable computing device to determine mobile edge nodes that serve radio coverage areas at different positions along a path that the mobile device is expected to take while receiving the content. The software instructions further cause the programmable computing device to allocate for storage in respective caches of the mobile edge nodes different portions of the content that are expected to be served by different mobile edge nodes as the mobile device moves along the path.

Aspects of the present disclosure are illustrated by way of example and are not limited by these figures, with like references indicating like elements. In general, the use of a reference numeral should be regarded as referring to the depicted subject matter generally, whereas discussion of a specific instance of an illustrated element will append a letter designation thereto (e.g., discussion of a base station 125, generally, as opposed to discussion of particular base stations 125a, 125b, 125c).

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
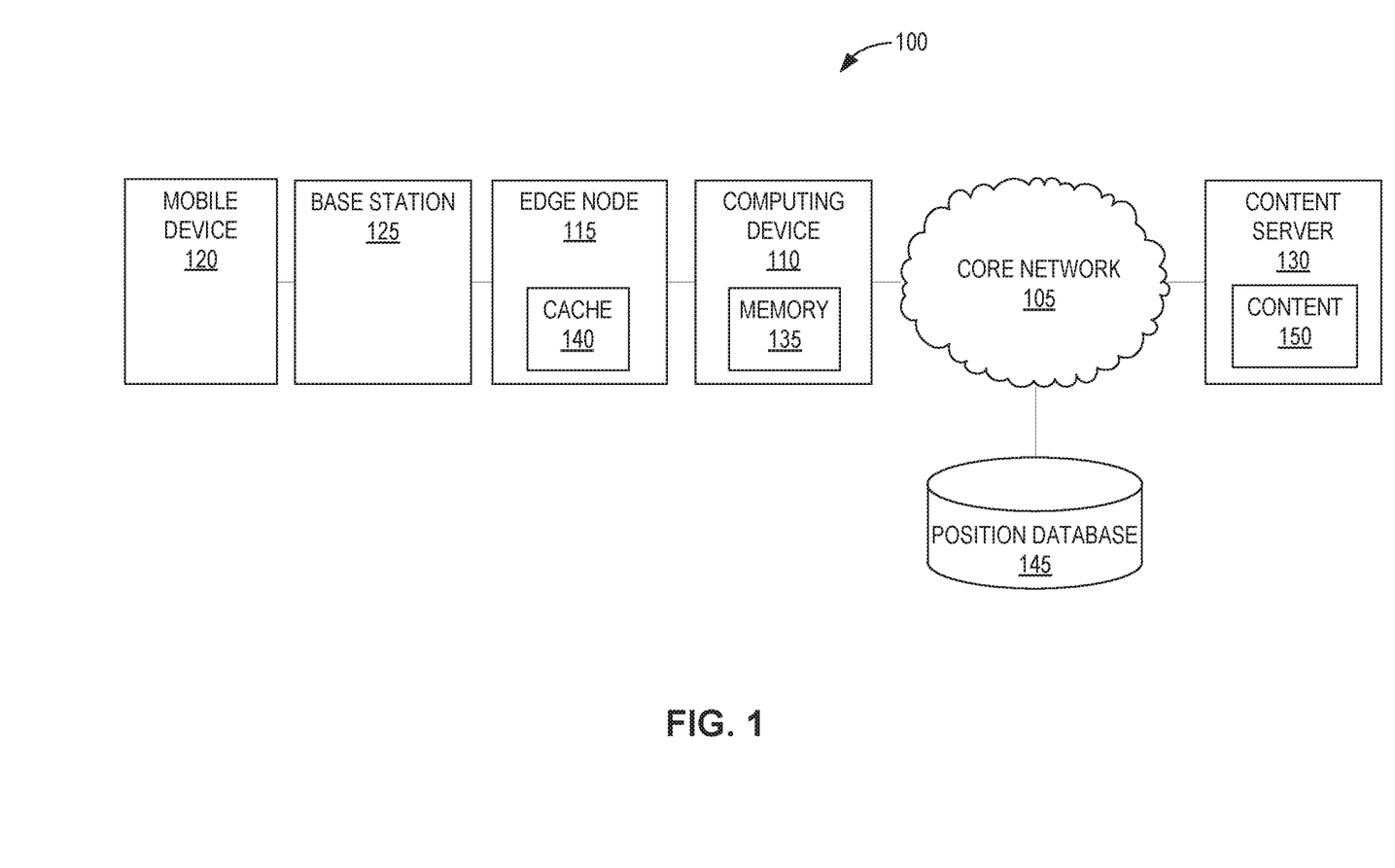
FIG. 1 is a block diagram illustrating an example computing environment according to embodiments of the present disclosure.

FIG. 1 illustrates an example network environment 100 that includes a mobile device 120, a base station 125, an edge node 115, a computing device 110, a content server 130, a position database 145, and a network 105. The network environment 100 supports the exchange of messages between the mobile device 120 and content server 130 via the base station 125, edge node 115, computing device 110 and core network 105. At least some of such these messages may support the transport of content 150 at the content server 130 to the mobile device 120 for output to a user. According to embodiments, such messages may be included in a media stream carrying the content 150 from the content server 130 to the mobile device 120. Other such messages may be one or more requests from the mobile device 120 to the content server 130 requesting the content 150 and/or portions thereof. Other messages associated with the mobile device 120, content server 130, and/or networking environment 100 may also be exchanged, according to one or more embodiments.

Embodiments of the mobile device 120 include any device that comprises a radio interface for communicating wirelessly with the base station 125, and a user interface enabling the exchange of information with a human operator. Typical examples of the mobile device 120 include a smartphone, laptop computer, tablet computer, and/or wearable computer.

Embodiments of the base station 125 include any device that provides the mobile device 120 with wireless access to the core network 105 when the mobile device 120 is within a radio coverage area. In particular, the base station 125 forwards messages between the mobile device 120 and the edge node 115. Typical examples of the base station 125 include a Node B, Evolved Node B (eNodeB or eNB), Base Transceiver Station (BTS), and/or a femtocell.

Embodiments of the edge node 115 include any device that comprises a cache 140 and serves the radio coverage area of base station 125 by forwarding messages between the base station 125 and the computing device 110. According to embodiments, the edge node 115 is the last hop before the base station 125 for communications from the core network 105 toward the base station's 125 radio coverage area. As will be discussed in greater detail below, the cache 140 may be configured to store one or more portions of the content 150 as determined by the computing device 110. In some embodiments, the edge node 115 is an edge router, switch, hub, relay, and/or gateway. Embodiments of the edge node 115 may be a device at a network boundary, such as a boundary between an access network that includes the base station 125, and an edge network that includes the computing device 110.

Embodiments of the computing device 110 include any device that comprises a memory 135 and forwards messages between the core network 105 and the edge node 115. As will be discussed in greater detail below, the memory 135 may be configured to store one or more portions of the content 150. In some embodiments, one or more of the portions of the content 150 stored in memory 135 are sent to the mobile device 120 via the edge node 115 in response to a cache miss at edge node 115. According to embodiments, the computing device is a router, switch, hub, relay, and/or gateway.

The core network 105 includes one or more physical devices and/or signaling mediums capable of exchanging communication signals with the content server 130 and the computing device 110. Examples of the core network 105 include (but are not limited to) one or more of: the Internet (or a portion thereof); one or more local area networks; one or more wireless networks; one or more cellular networks; one or more Internet Protocol (IP) based networks (e.g., an IP Multimedia Subsystem (IMS)); one or more Ethernet networks; one or more optical networks; and/or one or more circuit-switched networks. Such a network 105 may comprise any number of networking devices such as routers, gateways, switches, hubs, firewalls, cables, and the like (not shown) supporting the exchange of such communication signals.

Embodiments of the content server 130 include any device capable of serving content 150 to mobile device 120 via one or more of the devices in the networking environment 100. Typical examples of the content server 130 include a server computer, server cluster, network attached storage, and/or a storage area network. Other examples of the content server 130 include a personal computer, a laptop computer, a desktop computer, a workstation, a smartphone, a tablet computer, a wearable computer, and/or a smart appliance.

In the example of FIG. 1, the position database 145 is connected to the core network 105. According to embodiments, the position database 145 comprises storage hardware configured to store a location history of the mobile device 120. For example, the computing device 110 or other device in the networking environment 100 may periodically update the position database 145 with the location of the mobile device 120 in association with the time in which the mobile device 120 was detected at that location. As will be discussed in greater detail below, the computing device 110 may, in some embodiments, use the location history stored in the position database 145 to determine if and when the mobile device 120 will be in the radio coverage area of the base station 125.

Particular embodiments of the networking environment 100 may differ. For example, although the example of FIG. 1 illustrates a position database 145 attached to the core network 105, other embodiments do not include a position database 145. Other embodiments may include a position database 145 that is attached to, or is comprised in, the computing device 110. Further, although content server 130, computing device 110, and edge node 115 are depicted as being communicatively connected to core network 105, according to other embodiments, one or more of the content server 130, the computing device 110, and the edge node 115 are comprised within the core network 105. Further still, although FIG. 1 depicts only a single content server 130, position database 145, core network 105, computing device 110, edge node 115, base station 125, and mobile device 120, other embodiments include any number of these devices.

Figure 2:
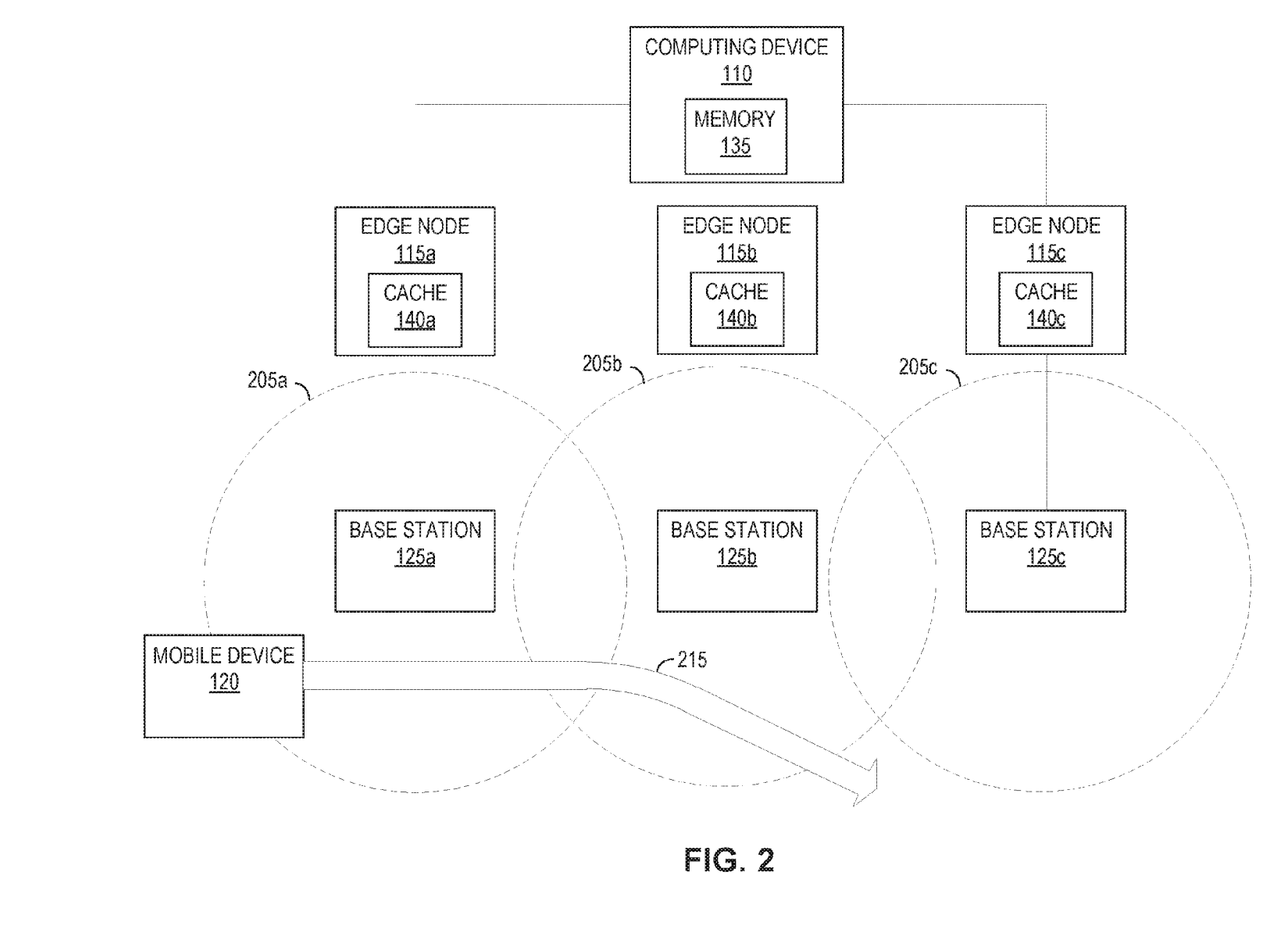
FIG. 2 is a block diagram illustrating an example of mobile edge nodes serving radio coverage areas, some of which are at different positions along a path that the mobile device is expected to take, according to embodiments of the present disclosure.

In particular, FIG. 2 illustrates an example that includes a computing device 110 in communication with three edge nodes 115*a-c*. The edge nodes 115*a-c* respectively serve geographically-distinct radio coverage areas 205*a-c* of corresponding base stations 125*a-c*. In this example, mobile device 120 moves into the radio coverage area 205*a* of base station 125*a* while downloading content 150 from the content server 130. Based on the mobile device's 120 current trajectory and/or location history, the mobile device 120 may be expected to continue along path 215. As such, the mobile device 120 may be expected to take a first duration of time to traverse coverage area 205*a* before entering coverage area 205*b*. The mobile device 120 may then be expected to take a second duration of time to traverse coverage area 205*b*. The mobile device may then exit coverage area 205*b* without entering coverage area 205*c*.

To reach the mobile device 120, at least some of the content 150 may transported via the computing device 110. Accordingly, the computing device 110 may identify that content 150 is to be transmitted to the mobile device 120. Further, because mobile device 120 is moving, different portions of the content 150 may need to be sent via different edge nodes 115*a-c*. Thus, in some embodiments, the computing device 110 may determine the path 215 that the mobile device 120 is expected to take, e.g., in order to identify which of the edge nodes 115*a-c* are likely to require at least some of the content 150.

The computing device 110 may determine this path 215 based on the above-discussed location history stored in the position database 145 and/or a current trajectory of the mobile device 120. The location history and/or current trajectory may, for example, be determined by the computing device 110 through time difference of arrival techniques involving the base stations 125a-c and/or by receiving Global Positioning System (GPS) coordinates from the mobile device 120. Other positioning solutions for determining the location, location history, and/or current trajectory of the mobile device 120 may also or alternatively be used to determine the path 215.

Based on the path 215, the computing device 110 may determine the edge nodes 115a-b that serve the radio coverage areas 205a-b at different positions along that path 215. In addition, the computing device 110 may determine an expected duration in which the mobile device 120 will be within each radio coverage area 205a-b served by the edge nodes 205a-b, respectively. For example, the computing device 110 may receive sample velocity measurements taken by a base station 125a-b serving one of the radio coverage areas 205a-b, and based on such measurements and the path 215, determine an expected duration in which the mobile device 120 will traverse one or more of the radio coverage areas 205a-b.

Based on the duration in which the mobile device 120 is expected to be within each of the radio coverage areas 205a-b and/or the average data rate of the mobile device 120, the computing device 110 may determine how much of the content 150 the mobile device 120 will need while in each of the radio coverage areas 205a-b along the path 215.

Figure 3A:
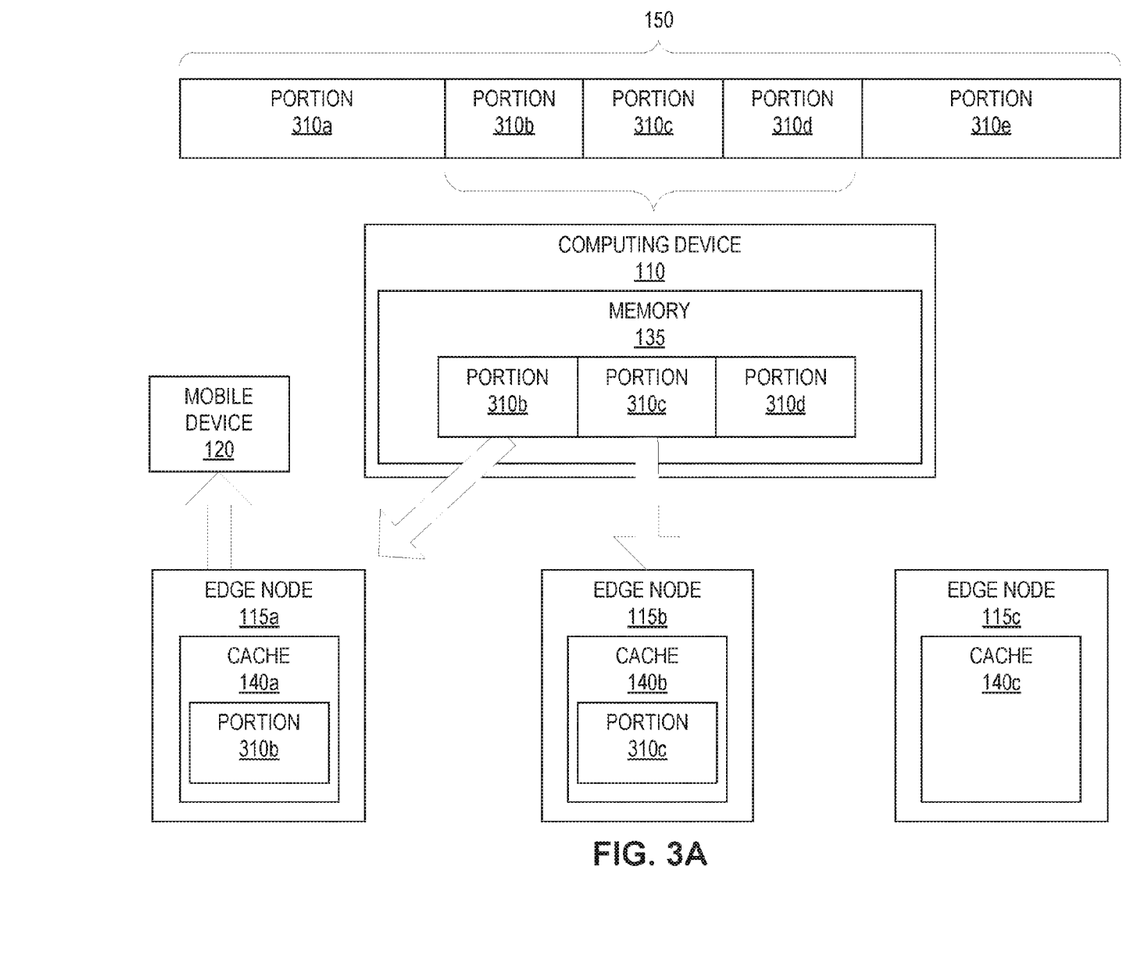
FIG. 3A is a block diagram illustrating an example of allocating for storage in respective caches of mobile edge nodes different portions of content, according to embodiments of the present disclosure.

Accordingly, as shown in FIG. 3A, the computing device 110 may determine a size of a portion 310b-c of the content 150 that corresponds to each of the radio coverage areas 205a-b along the path 215, and identify portions 310b-c of the content 150 that correspond to those sizes. The computing device may then store those portions 310b-c in memory 135, and allocate them for storage in caches 140a-b of edge nodes 115a-b, respectively. In some embodiments the allocation of the portions 310b-c to the caches 140a-b allows for content portions 310b-c to be available for retrieval from edge nodes 115a-b during the time that the mobile device 120 will be in the corresponding radio coverage areas 205a-b. Such embodiments may also reduce the latency in which the portions 310b-c may be retrieved by the mobile device 120 as compared to the latency required to transport those same portions 310b-c all the way from the content server 130.

The computing device 110 may also identify further portions 310a, 310d-e of the content 150. In this particular example, the computing device 110 identifies that the mobile device 120 will not likely need portion 310a. For example, the mobile device 120 may already be streaming content 150 from a playback position that is later in the stream than portion 310a and/or may have downloaded portion 310a previously. In this example, the computing device 110 also identifies, based on the path and determined durations, that the mobile device 120 is expected to be outside of the radio coverage areas 205a-c before it will need portion 310e. Accordingly, in this example, the computing device 110 decides not to retrieve portions 310a and 310e for storage in memory 135 or for allocation and transmission to caches 140a-c.

In contrast to portions 310a and 310e, the computing device 110 decides, in this example, to retrieve portion 310d for storage in memory 135 and at least temporarily refrains from allocating the portion 310d to any cache 140a-c. The computing device 110 may refrain from allocating the portion 310d because, in view of the expected path 215 and/or durations determined with respect to the radio coverage areas 205a-c, the computing device 110 determines that the mobile device 120 is unlikely to need that portion 210d while within the radio coverage areas 205a-c. Nonetheless, the computing device 110 may retrieve the portion 210d from the content server 130 for storage in memory 135 for various reasons, depending on particular embodiments. For example, the computing device may store portion 310d in memory 135 so that the computing device 110 is able to quickly allocate and transmit at least some of portion 310d to one or more of the caches 140a-c in response to the mobile device 120 taking longer to traverse the path 215 than expected. For another example, the computing device 110 may store portion 310d in memory 135 so that the computing device 110 is able to transmit at least some of portion 310d to the mobile device 120 in response to a cache miss at either edge node 115a-b to which a portions 310b-c have been allocated. According to particular embodiments consistent with such examples, the memory 135 may act as a second-level cache to avoid having to later retrieve portion 310d from the content server 130.

In the example of FIG. 3A, the mobile device 120 is being served by edge node 115a, but not by edge node 115b. Although mobile device 120 may be expected to later enter radio coverage area 205b of edge node 115b, the mobile device 120 may, in some embodiments, behave differently from such expectations. For example, the mobile device 120 may change speed and/or deviate from the expected path 215. Accordingly, portion 310c allocated to the cache 140b of edge node 115b may actually never be needed by the mobile device 120 and/or edge node 115b. Accordingly, in some embodiments, the computing device 110 refrains from transmitting portion 310c to edge node 115b at least until the computing device 110 detects a handover of the mobile device 120 into corresponding radio coverage area 205b. Such embodiments may avoid needlessly transmitting portion 310c to edge node 115b in cases where the mobile device 120 deviates from the expected path 215 and does not handover to radio coverage area 205b as expected.

In other embodiments, in response to the allocation of portion 310c to cache 140b and in advance of the mobile device 120 being handed over to radio coverage area 205b, the computing device 110 begins transmitting portion 310c to edge node 115b. Such embodiments may allow transmission of portion 310c to edge node 115b to commence earlier (and in some embodiments at a lower overall bitrate) as compared to transmitting portion 310c upon handover of the mobile device 120 to radio coverage areas 205b.

Figure 3B:
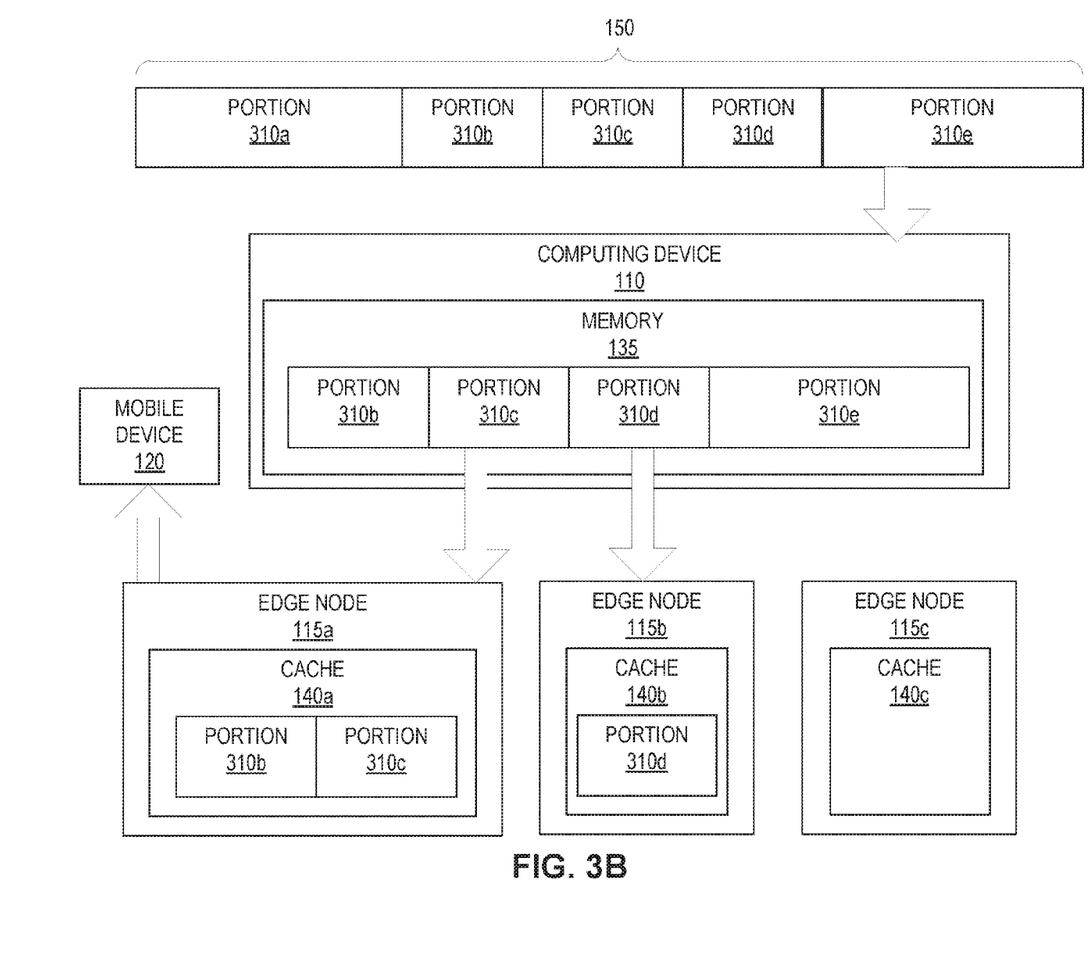
FIG. 3B is a block diagram illustrating an example of changing the mobile edge node to which a portion of content is allocated in response to a change in speed of the mobile device, according to embodiments of the present disclosure.

FIG. 3B illustrates an example in which a change in speed of the mobile device occurs and the computing device 120, in response changes the edge node 115 to which at least some of one of the portions 310b-c is allocated. In this particular example, the mobile device 120 slows down such that the computing device 120 determines that the mobile device 120 is likely to remain within the radio coverage area 205a of edge node 115a longer than previously expected. As such, the previous allocation of portion 310b is likely to be inadequate to meet the data requirements of the mobile device 120 while the mobile device 120 is within radio coverage area 205a. Accordingly, the computing device 110 changes the edge node 115 to which portion 310c is allocated from edge node 115b to edge node 115a, e.g., to meet the newly-anticipated data requirements that mobile device 120 will have while within radio coverage area 205a. Additionally, according to this particular example, the computing device 110 allocates portion 310d to edge node 115b, e.g., to replace the previous allocation of portion 310c to edge node 115b. Additionally, in this particular example, the computing device 110 also retrieves portion 310e for storage in memory 135, e.g., to replace the previous unallocated retention of portion 310d in memory 135.

Figure 3C:
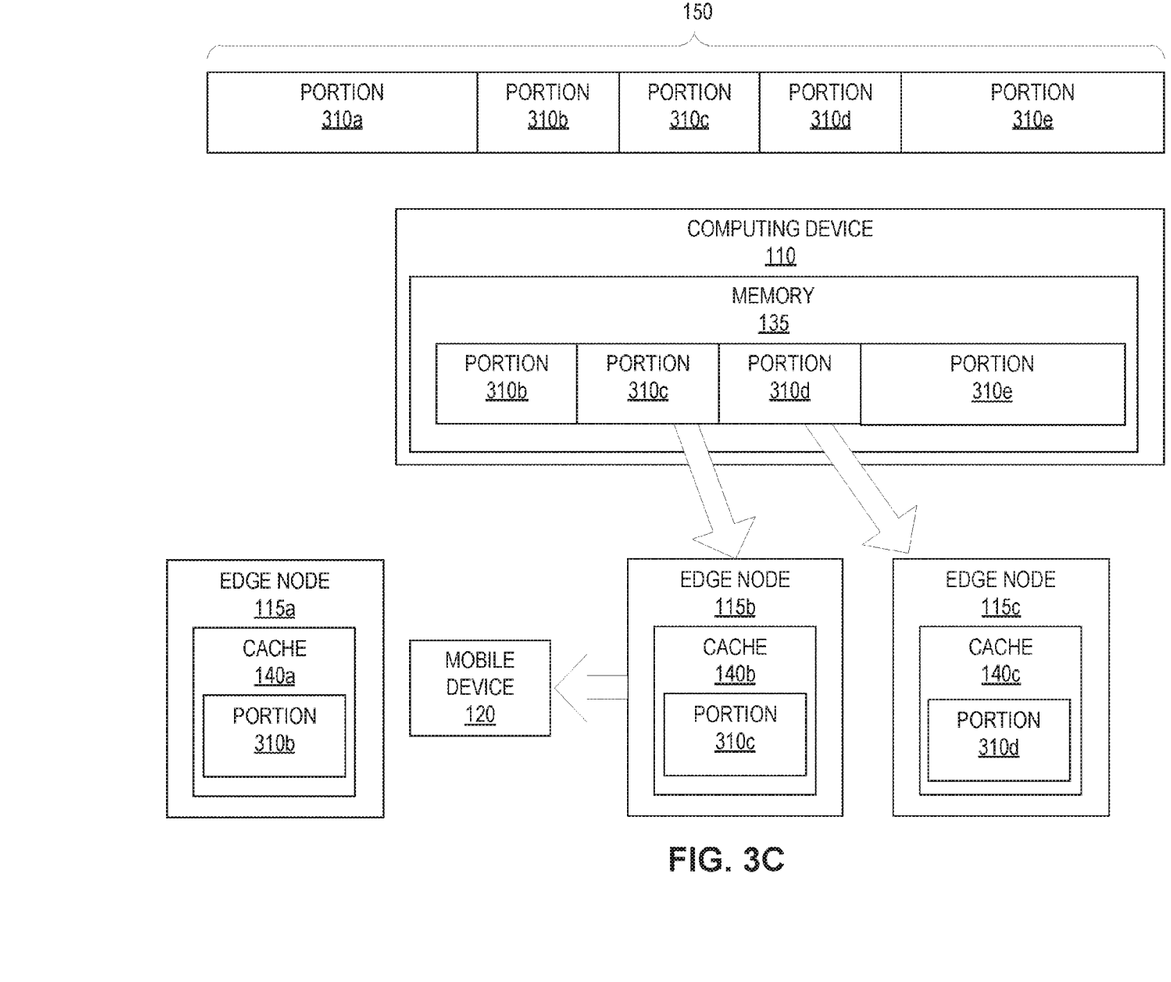
FIG. 3C is a block diagram illustrating an example of changing the mobile edge node to which a portion of content is allocated in response to a deviation of the mobile device from an expected path, according to embodiments of the present disclosure.

As discussed above, the mobile device 120 may also deviate from the anticipated path 215. FIG. 3C illustrates an example in which a deviation of the mobile device 120 from the path 215 occurs, and the computing device 120, in response, changes the edge node 115 to which at least some of one of the portions 310b-d is allocated. In this particular example, the mobile device 120 changes its trajectory such that the mobile device 120 enters radio coverage area 205b corresponding to edge node 115b much earlier than anticipated in the example of FIG. 3B. Further, based on this new trajectory, the computing device 110 determines that the mobile device 120 is likely to handover to radio coverage area 205c thereafter. The computing device 110 responds by changing the edge node 115 to which portions 310c-d are allocated. Specifically, the allocation of portion 310c is changed from edge node 115a to edge node 115b for storage in cache 140b (thereby reversing the allocation performed in the example of FIG. 3B). In addition, the allocation of portion 310d is changed from edge node 115b to edge node 115c for storage in cache 140c.

Figure 3D:
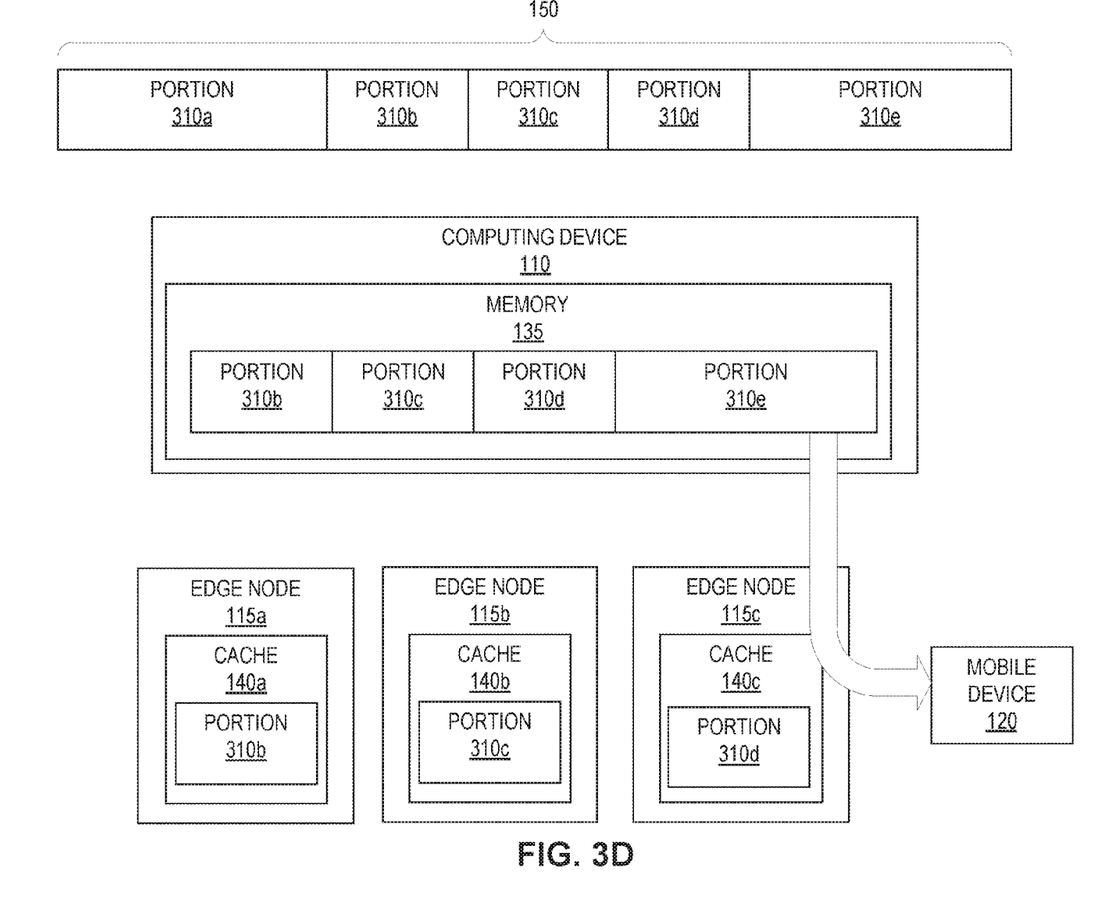
FIG. 3D is a block diagram illustrating an example of transmitting a portion of content to a mobile device in response to a cache miss at mobile edge nodes, according to embodiments of the present disclosure.

In the previous examples of FIGS. 3B and 3C, the computing device 110 responded to changing conditions by changing the edge node 115 to which at least some of one of the different portions 310b-d were allocated. However, the computing device 110 may respond differently in response to other circumstances. In the example of FIG. 3D, the mobile device 120, after handing over to radio coverage area 205c corresponding to edge node 115c, unexpectedly requires portion 310e, resulting in a cache miss at edge node 115c. For example, a user of the mobile device 120 may skip ahead or fast forward through the content 150 to a portion 310e that is not available at cache 140c. In response, the computing device 120 transmits portion 310e toward mobile device 120.

Various examples above illustrate ways that the computing device 110 may adjust to changing conditions and/or respond to unexpected circumstances. Notwithstanding these features, embodiments may seek to avoid cache misses and/or reallocating portions 310, for example. Although cache misses and/or reallocations may generally be avoided by allocating as much of the content 150 as possible to each of the caches 140a-c, the caches 140a-c may be of a limited capacity and used by several mobile devices 120 at any given time, thereby making them unsuitable for storing a significant amount of the content 150. Accordingly, in some embodiments, the computing device 110 determines a size for each of the portions 310b-d to be allocated that balances the need for high content 150 availability against the limitations of the caches 140a-c.

Figure 4:
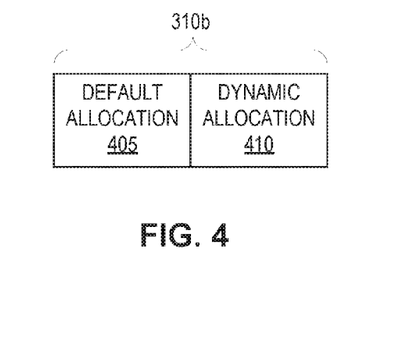
FIG. 4 is a block diagram illustrating an example allocated portion, according to embodiments of the present disclosure.

FIG. 4 illustrates an example portion 310b having a particular size determined by the computing device 110. According to this example, the size determined for portion 310b is based on a default allocation 405 and a dynamic allocation 410. For example, the default allocation 405 may be based on the present state of the mobile device 120, whereas the dynamic allocation 410 supplements the default allocation 405, e.g., by correcting for one or more deviations of the mobile device 120 from criteria used to determine the default allocation 405. In some embodiments, the dynamic allocation 410 is based on observed deviations from previous expectations. For example, the default allocation 405 may be based on the average bandwidth experienced by the mobile terminal 120 and/or the duration in which the mobile terminal 120 is expected to remain with a particular radio coverage area 205, whereas the dynamic allocation 410 may be based on the difference between duration expectations and actual durations spent within particular radio coverage areas 205. In another example, the dynamic allocation 410 may be based on one or more speed or velocity deviations. In such an example, the computing device 110 may sum all of the deviations from path 215 occurring within a particular time period, and determine the dynamic allocation 410 based on that sum. In some embodiments, the computing device 110 may increase the dynamic allocation 410 in response to negative deviations in speed and/or velocity. In some embodiments, the computing device 110 may determine a dynamic allocation 410 of zero for the portion 310b in response to positive deviations in speed and/or velocity. Other criteria for determining the default allocation 405 and dynamic allocation 410 may additionally or alternatively be used to determine the size of portion 310b.

In some embodiments, the default allocation 405 may be further based on a predefined minimum size. In such cases, the computing device 110 may identify a portion 310b from the content 150 that is at least the predefined minimum size for every allocation for storage to caches 140a-c.

Figure 5:
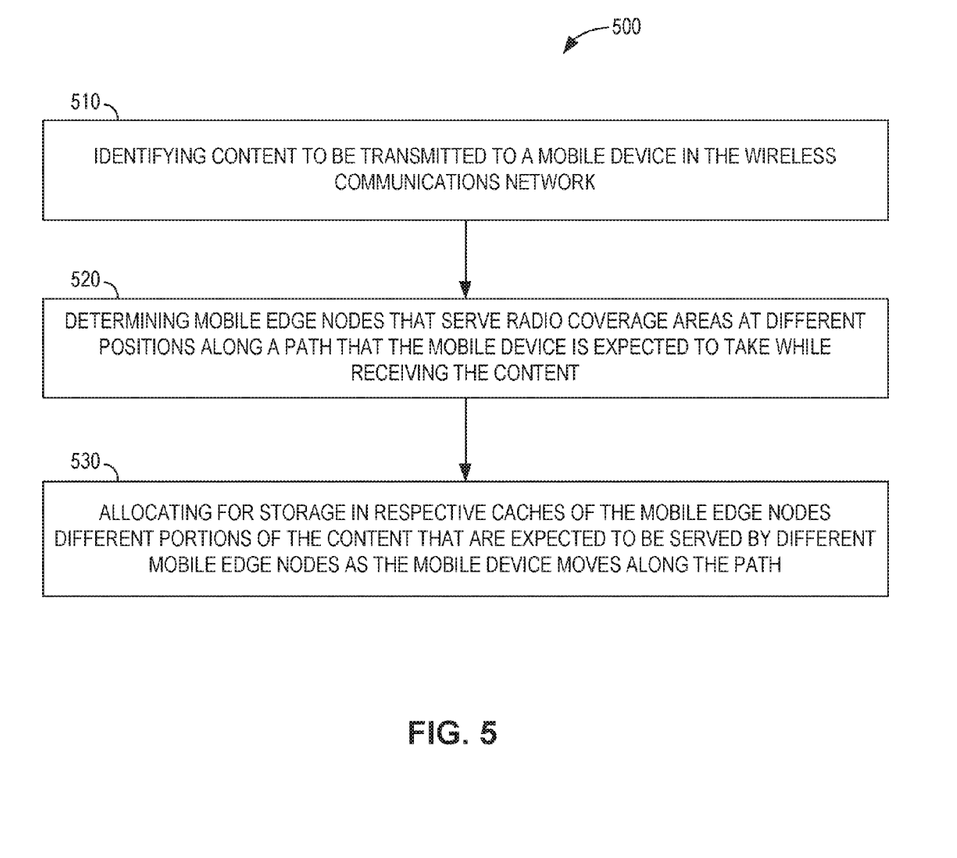
FIG. 5 is a flow diagram illustrating an example method, according to embodiments of the present disclosure.

In view of the above, FIG. 5 illustrates an example method 500 implemented by a computing device 110 in a wireless communications network 100. The method 500 comprises identifying content 150 to be transmitted to a mobile device 120 in the wireless communications network 100 (block 510). The method 500 further comprises determining mobile edge nodes 115a-b that serve radio coverage areas 205a-b at different positions along a path 215 that the mobile device 120 is expected to take while receiving the content 150 (block 520). The method further comprises allocating for storage in respective caches 140a-b of the mobile edge nodes 115a-b different portions 310b-c of the content 150 that are expected to be served by different mobile edge nodes 115a-b as the mobile device 120 moves along the path 215 (block 530).

Figure 6:
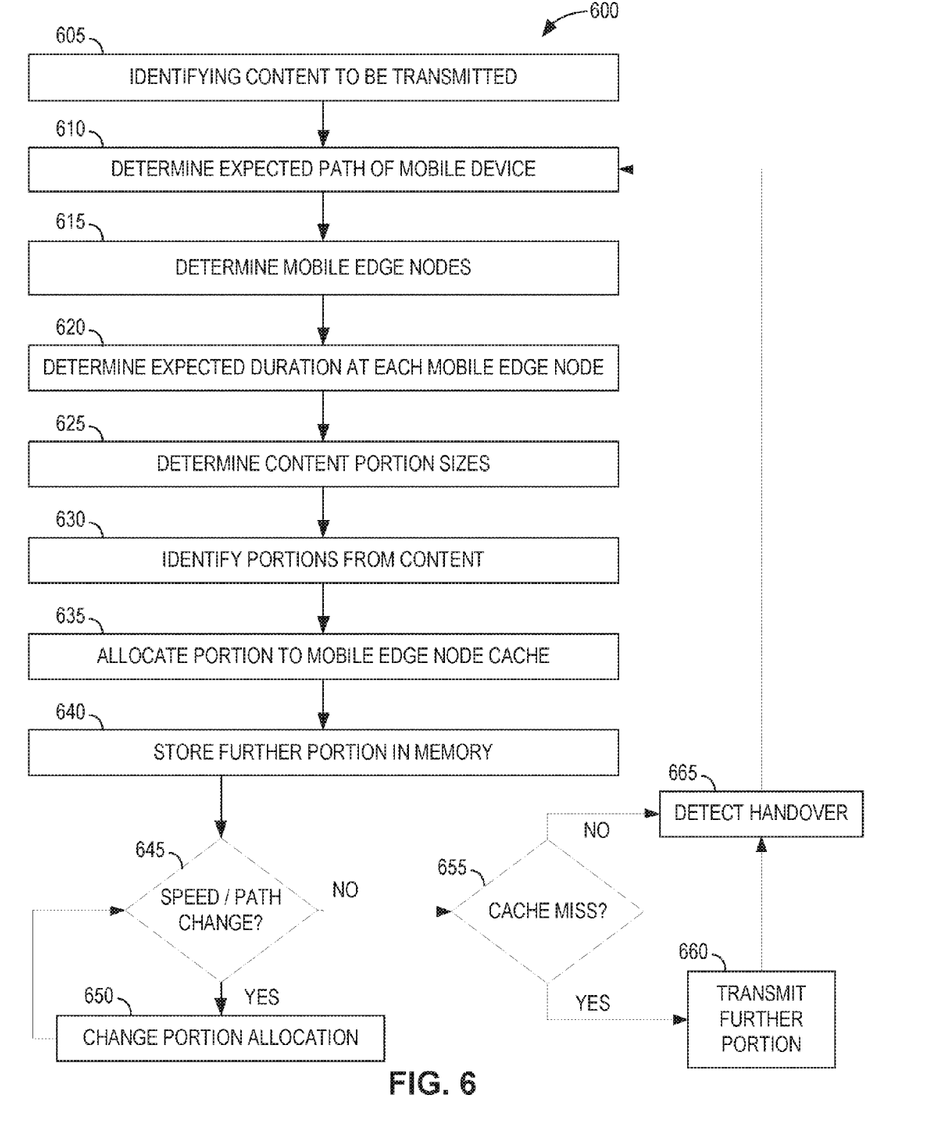
FIG. 6 is a flow diagram illustrating a more detailed method, according to embodiments of the present disclosure.

FIG. 6 illustrates a more detailed method 600 implemented by a computing device 110 in a wireless communications network 100, in accordance with one or more of the embodiments discussed above. In particular, the method 600 comprises identifying content 150 to be transmitted to a mobile device 120 (block 605). The method 600 further comprises determining an expected path 215 of the mobile device 120, e.g., as discussed above (block 610). The method 600 further comprises determining a plurality of mobile edge nodes 115a-b serving radio coverage areas 205a-b at different positions along the path 215 (block 615). The method 600 further comprises determining, for each mobile edge node 115a-b, an expected duration in which the mobile device 120 will be within the corresponding radio coverage area 205a-b (block 620).

The method 600 further comprises determining a portion size for each of the mobile edge nodes 115a-b, e.g., based on a default allocation 405 and a dynamic allocation 410, as discussed above (block 625). The method 600 further comprises identifying portions 310b-c from the content 150 based on the determined portion sizes (block 630), and allocating those portions 310b-c to the caches 140a-b of mobile edge nodes 115a-b, respectively (block 635). The method 600 further comprises storing a further portion 310d of the content 150 in a memory 135 of the computing device 110 (block 640).

The method 600 further comprises determining whether the mobile device 120 changes speed and/or deviates from the path 215 (block 645). If so, the computing device 110 changes the allocation of at least some of one of portions 310*a-b*, as discussed above (block 650), and will determine whether any further speed and/or path deviations occur (block 645). If no speed and/or path deviations occur, the computing device 110 determines whether a cache miss occurs at caches 140*a-b* (block 655). If so, the computing device 110 transmits the further portion 310*d* towards the mobile device 120 (block 660).

Whether or not a cache miss occurs, the method 600 further comprises detecting a handover of the mobile device 120, e.g., from radio coverage area 205*a* to radio coverage 205*b* (block 665). In response to detecting the handover, the computing device 110 may redetermine the expected path of the mobile device 120 as previously discussed (block 610).

Figure 7:
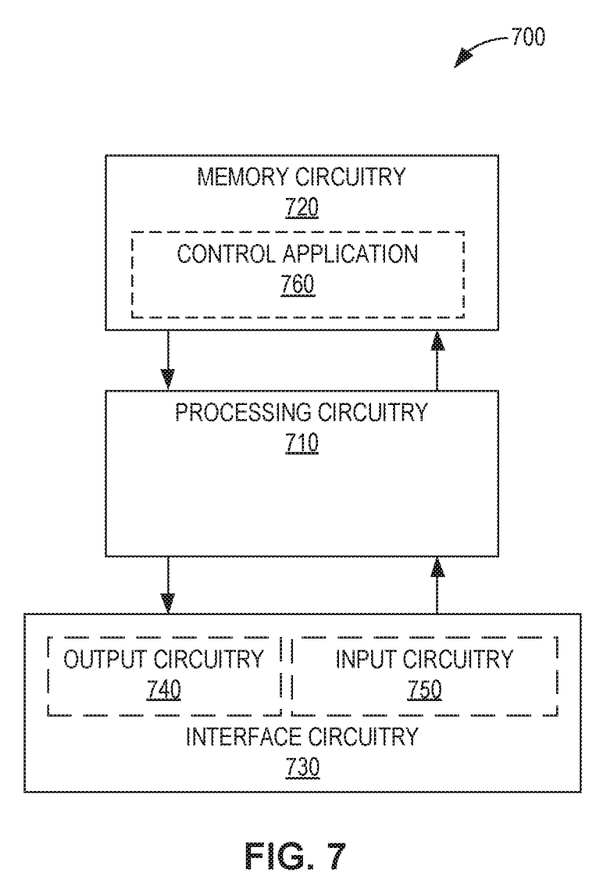
FIG. 7 is a block diagram illustrating example hardware useful for implementing one or more methods described herein, according to embodiments of the present disclosure.

Other embodiments of the present disclosure include the computing device 110 implemented according to the hardware illustrated in FIG. 7. The example hardware of FIG. 7 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals over a communications network 105. Such I/O data paths may also include data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communications network 105) and input circuitry 750 (e.g., receiver circuitry configured to receive communication signals over the communications network 105). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments of the hardware illustrated in FIG. 6, the interface circuitry 730 is configured to exchange signals via a wireless communications network 100. The processing circuitry 710 is configured to identify content 150 to be transmitted to a mobile device 120 in the wireless communications network 100. The processing circuitry 710 is further configured to determine mobile edge nodes 115*a-b* that serve radio coverage areas 205*a-b* at different positions along a path 215 that the mobile device 120 is expected to take while receiving the content 150. The processing circuitry 710 is further configured to allocate for storage in respective caches 140*a-b* of the mobile edge nodes 115*a-b* different portions 310*b-c* of the content 150 that are expected to be served by different mobile edge nodes 115*a-b* as the mobile device 120 moves along the path 215.

Figure 8:
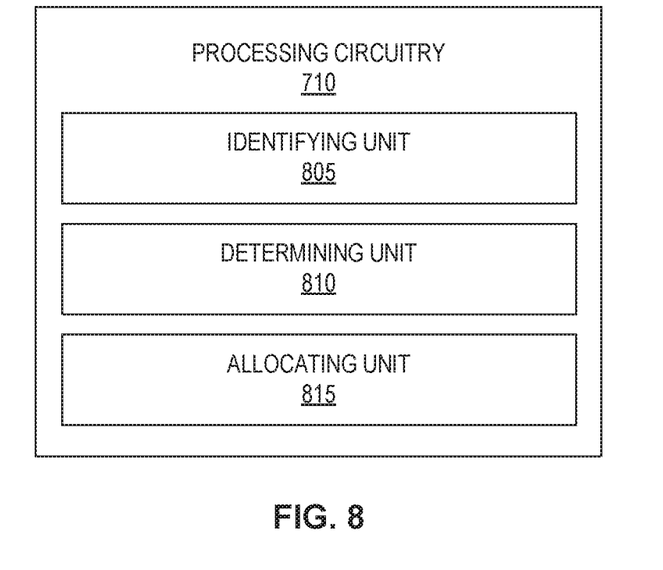
FIG. 8 is a block diagram illustrating example physical units of processing circuitry of a computing device useful for implementing one or more methods described herein, according to embodiments of the present disclosure.

Other embodiments of the present disclosure include the example processing circuitry 710 of the computing device 110 as illustrated in FIG. 8. The processing circuitry 710 comprises a plurality of communicatively coupled physical units. In particular, the processing circuitry 710 comprises an identifying unit 805, a determining unit 810, and an allocating unit 815. The identifying unit 805 is configured to identify content 150 to be transmitted to a mobile device 120 in a wireless communications network 100. The determining unit 810 is configured to determine mobile edge nodes 115*a-b* that serve radio coverage areas 205*a-b* at different positions along a path 215 that the mobile device 115*a-b* is expected to take while receiving the content 150. The allocating unit 815 is configured to allocate for storage in respective caches 140*a-b* of the mobile edge nodes 115*a-b* different portions 310*b-c* of the content 150 that are expected to be served by different mobile edge nodes 115*a-b* as the mobile device 120 moves along the path 215.

Figure 9:
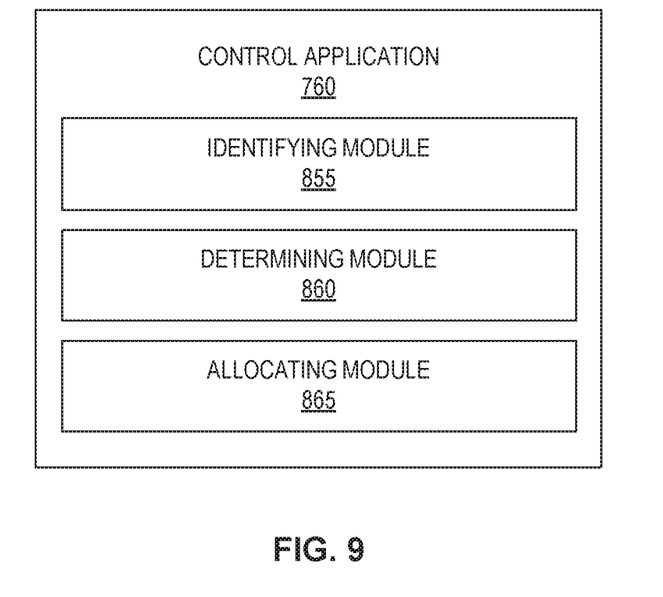
FIG. 9 is a block diagram illustrating example software modules of a control application in a computing device useful for implementing one or more methods described herein, according to embodiments of the present disclosure.

Other embodiments of the present disclosure include the example control software 760 of computing device 710, as illustrated in FIG. 9. The control software 760 of FIG. 9 comprises a plurality of software modules. In particular, this control software 760 comprises an identifying module 855, a determining module 860, and an allocating module 865. The identifying module 855 is configured to identify content 150 to be transmitted to a mobile device 120 in a wireless communications network 100. The determining module 860 is configured to determine mobile edge nodes 115*a-b* that serve radio coverage areas 205*a-b* at different positions along a path 215 that the mobile device 115*a-b* is expected to take while receiving the content 150. The allocating module 865 is configured to allocate for storage in respective caches 140*a-b* of the mobile edge nodes 115*a-b* different portions 310*b-c* of the content 150 that are expected to be served by different mobile edge nodes 115*a-b* as the mobile device 120 moves along the path 215.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented in a computing device in a wireless communications network, the method comprising:
    identifying content to be transmitted to a mobile device in the wireless communications network;
    determining mobile edge nodes that serve radio coverage areas at different positions along a path that the mobile device is expected to take while receiving the content; and
    allocating for storage in respective caches of the mobile edge nodes different portions of the content that are expected to be served by different mobile edge nodes as the mobile device moves along the path, wherein a size of each different portion is determined based on:
        an expected duration in which the mobile device will be within the radio coverage area served by the mobile edge node to which the portion will be allocated;
        a default allocation that is at least a predefined minimum size; and
        a dynamic allocation that supplements the default allocation and corrects for a deviation of the mobile device from criteria used to determine the default allocation.

2. The method of claim 1, further comprising changing the mobile edge node to which at least some of one of the different portions of the content is allocated in response to one or both of:
    a change in speed of the mobile device;
    a deviation of the mobile device from the path.

3. The method of claim 1, further comprising identifying each of the different portions of the content to be allocated for storage from the content.

4. The method of claim 1, wherein determining the size is further based on an average data rate of the mobile device.

5. The method of claim 1, further comprising determining the expected duration based on a sample velocity measurement of the mobile device.

6. The method of claim 1, further comprising determining the path based on one or both of a location history and a current trajectory of the mobile device.

7. The method of claim 1, further comprising storing in a memory of the computing device a further portion of the content and transmitting the further portion towards the mobile device in response to a cache miss at one or more of the mobile edge nodes.

8. The method of claim 1, wherein each of the mobile edge nodes is a last hop before a radio base station serving one of the radio coverage areas for communication from the wireless communications network toward that radio coverage area.

9. A computing device in a wireless communications network, the computing device comprising:
    a processor and a memory, the memory containing instructions executable by the processor whereby the computing device is configured to:
        identify content to be transmitted to a mobile device in the wireless communications network;
        determine mobile edge nodes that serve radio coverage areas at different positions along a path that the mobile device is expected to take while receiving the content; and
        allocate for storage in respective caches of the mobile edge nodes different portions of the content that are expected to be served by different mobile edge nodes as the mobile device moves along the path, wherein a size of each different portion is determined based on:
            an expected duration in which the mobile device will be within the radio coverage area served by the mobile edge node to which the portion will be allocated;
            a default allocation that is at least a predefined minimum size; and
            a dynamic allocation that supplements the default allocation and corrects for a deviation of the mobile device from criteria used to determine the default allocation.

10. The computing device of claim 9, wherein the computing device is further configured to change the mobile edge node to which at least some of one of the different portions of the content is allocated in response to one or both of:
    a change in speed of the mobile device;
    a deviation of the mobile device from the path.

11. The computing device of claim 9, wherein the computing device is further configured to identify each of the different portions of the content to be allocated for storage from the content.

12. The computing device of claim 9 wherein the computing device is configured to determine the size further based on an average data rate of the mobile device.

13. The computing device of claim 9, wherein the computing device is further configured to determine the expected duration based on a sample velocity measurement of the mobile device.

14. The computing device of claim 9, wherein the computing device is further configured to determine the path based on one or both of a location history and a current trajectory of the mobile device.

15. The computing device of claim 9, wherein the computing device is further configured to store in the memory a further portion of the content and transmit the further portion towards the mobile device in response to a cache miss at one or more of the mobile edge nodes.

16. The computing device of claim 9, wherein each of the mobile edge nodes is a last hop before a radio base station serving one of the radio coverage areas for communication from the wireless communications network toward that radio coverage area.

17. A non-transitory computer readable medium storing a computer program product for controlling a programmable computing device in a wireless communications network, the computer program product comprising software instructions that, when executed by the programmable computing device, cause the programmable computing device to:
    identify content to be transmitted to a mobile device in the wireless communications network;
    determine mobile edge nodes that serve radio coverage areas at different positions along a path that the mobile device is expected to take while receiving the content; and
    allocate for storage in respective caches of the mobile edge nodes different portions of the content that are expected to be served by different mobile edge nodes as the mobile device moves along the path, wherein a size of each different portion is determined based on:
        an expected duration in which the mobile device will be within the radio coverage area served by the mobile edge node to which the portion will be allocated;
        a default allocation that is at least a predefined minimum size; and a dynamic allocation that supplements the default allocation and corrects for a deviation of the mobile device from criteria used to determine the default allocation.

\* \* \* \* \*